No. 814,899. PATENTED MAR. 13, 1906.
A. BRAUNS.
RUBBER ERASER.
APPLICATION FILED JULY 31, 1905.
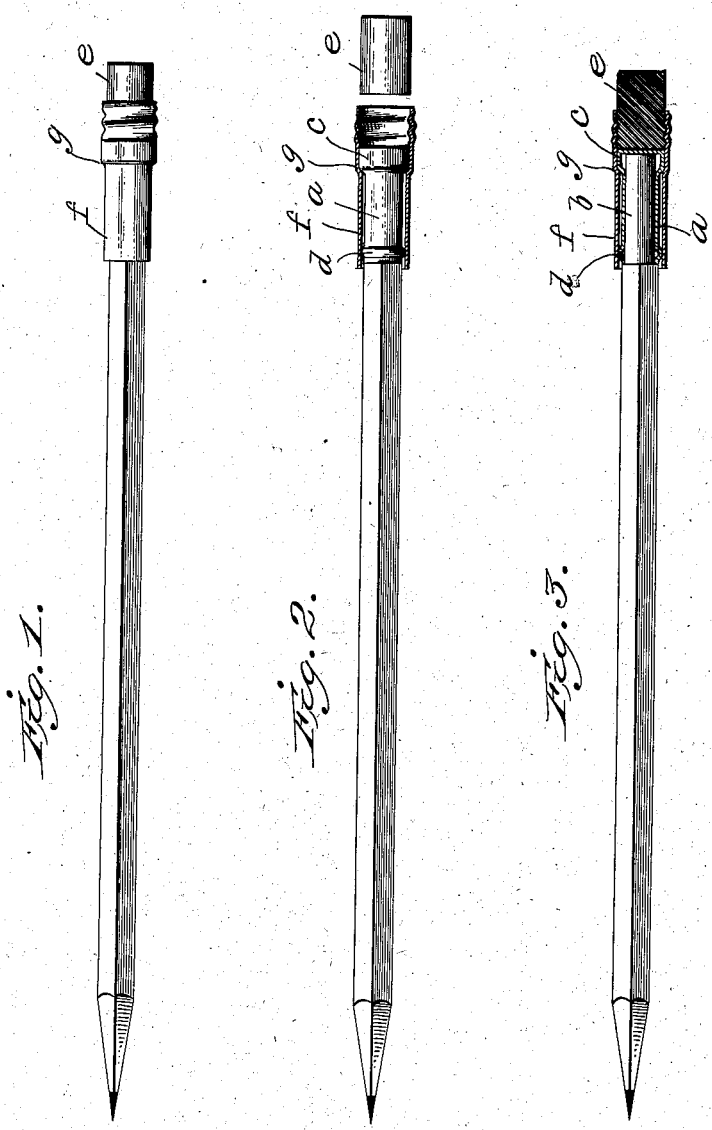
Witnesses:
Edwin L. Jewell
L. B. Bridges
Inventor
August Brauns,
By Davis & Davis,
Attorneys

UNITED STATES PATENT OFFICE.

AUGUST BRAUNS, OF GREEN BAY, WISCONSIN.

RUBBER ERASER.

No. 814,899.　　　　Specification of Letters Patent.　　　Patented March 13, 1906.

Application filed July 31, 1905. Serial No. 272,085.

*To all whom it may concern:*

Be it known that I, AUGUST BRAUNS, a citizen of the United States of America, and a resident of Green Bay, county of Brown, State of Wisconsin, have invented certain new and useful Improvements in Rubber Erasers, of which the following is a full and clear specification, reference being had to the accompanying drawings, in which—

Figure 1 represents a side elevation of a lead-pencil provided with my improvement; Fig. 2, a similar view showing the rubber tip in the act of being screwed into its holding-cylinder, and Fig. 3 a longitudinal section with the parts secured together as in Fig. 1.

The object of this invention is to so mount and attach the rubber tip that it may be rotated freely while in use, thereby avoiding streaking or smearing the dirt or lead that may be on the paper, as more fully hereinafter set forth. To the accomplishment of this object and such others as may hereinafter appear, the invention consists of the parts and combination of parts hereinafter fully described, and particularly pointed out in the appended claims, reference being had to the accompanying drawings, forming a part of this specification, in which the same reference characters designate like parts throughout the several views.

Fastened rigidly on the end of the pencil is a sleeve-like cap $a$, which is preferably fitted on a reduced extension $b$ of the pencil. This cap is enlarged at its closed end to form a head $c$, and near the other end of the sleeve is formed an annular rib or projection $d$ of less height than the shoulder formed by the head $c$.

The rubber eraser-tip $e$ is screwed into a sleeve $f$, which is rotatably mounted upon the permanent sleeve $a$. This sleeve $f$ is provided at $g$ with an annular shoulder, which abuts against the shoulder formed by the head $c$ and prevents the sleeve slipping off over said head $c$. The rubber tip $e$ is screwed into the open end of sleeve $f$ far enough to come lightly in contact with the head of sleeve $a$, thereby keeping the annular shoulder $g$ in loose contact with the annular shoulder on the permanent sleeve. This construction permits the sleeve $f$, carrying the rubber, to rotate freely on the permanent sleeve, and the annular shoulder $d$ affords a bearing for the lower or inner end of the rotatable sleeve, keeping it out of frictional contact with the permanent sleeve substantially throughout its length, thereby facilitating the free rotation of the sleeve carrying the rubber.

The manner of assembling the parts is shown in Fig. 2. The rotatable sleeve is first slipped on over the point end of the pencil until its shoulder $g$ comes into contact with the shoulder of the head $c$. Then the parts are secured in position by screwing in the rubber tip.

In using the device the operator grasps the pencil in such a manner as to leave the rotatable sleeve free to rotate, and then by properly adjusting the angle of the pencil with respect to the paper while rubbing the eraser-tip will rotate and at the same time cause enough friction on the paper to remove the dirt or pencil-marks, or the operator may grasp the body of the pencil in such manner as to leave the thumb and forefinger free to grasp and turn the tip-carrying sleeve during the act of using the device without turning the body of the pencil in his hand. Thus permitting or causing the rubber part to rotate during the act of erasing constantly brings new rubbing-surfaces into contact with the paper and carries away dirt and graphite that the rubbing action collects, thereby avoiding streaking and smearing the paper.

Having thus described my invention, what I claim, and desire to secure by Letters Patent, is—

1. In combination with a lead-pencil, a non-rotatable cap or sleeve fitted on over the end thereof, this sleeve being provided with an annular head at its outer end and an annular flange or projection at its inner end, this latter being of less height than the head portion, a rotatable sleeve enlarged at its outer end to form a socket for the head portion of the permanent sleeve, and a rubber tip removably fastened in the outer end of said rotatable sleeve, for the purpose set forth.

2. In combination with a pencil, a freely-rotatable sleeve mounted thereon and projecting beyond the end of the pencil and carrying a rubber eraser in said projecting portion, said rubber eraser being fastened to the sleeve so as to rotate with it, substantially as set forth.

3. In combination with a lead-pencil, a non-rotatable cap or sleeve fitted on over the end thereof, this sleeve being provided with an annular head at its outer end, a rotatable sleeve enlarged at its outer end to form a socket for the head portion of the permanent sleeve, and a rubber tip removably fastened in the outer end of said rotatable sleeve, for the purpose set forth.

In testimony whereof I hereunto affix my signature, in the presence of two witnesses, this 29th day of July, 1905.

AUGUST BRAUNS.

Witnesses:
LEON DREVENZKI,
HARRY R. ALBERT.